(12) United States Patent
Myers et al.

(10) Patent No.: US 10,183,677 B2
(45) Date of Patent: Jan. 22, 2019

(54) ICE AND SNOW DETECTION SYSTEMS AND METHODS

(71) Applicant: Ford Global Technologies, LLC, Dearborn, MI (US)

(72) Inventors: Scott Vincent Myers, Camarillo, CA (US); Ashley Elizabeth Micks, Mountain View, CA (US); Sneha Kadetotad, Cupertino, CA (US); Harpreetsingh Banvait, Sunnyvale, CA (US); Ashok E. Rodrigues, Farmington Hills, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 15/271,036

(22) Filed: Sep. 20, 2016

(65) Prior Publication Data

US 2018/0079424 A1    Mar. 22, 2018

(51) Int. Cl.
*B60W 40/06* (2012.01)
*G06N 7/00* (2006.01)
*G07C 5/00* (2006.01)

(52) U.S. Cl.
CPC ............. *B60W 40/06* (2013.01); *G06N 7/005* (2013.01); *G07C 5/008* (2013.01); *B60W 2600/00* (2013.01); *B60W 2710/18* (2013.01); *B60W 2710/20* (2013.01)

(58) Field of Classification Search
CPC ............. B60W 40/06; B60W 2600/00; B60W 2710/18; B60W 2710/20; G06N 7/005; G07C 5/008
See application file for complete search history.

(56) References Cited

U.S. PATENT DOCUMENTS

| 5,818,339 A | 10/1998 | Giles |
| 6,173,231 B1 | 1/2001 | Chojnacki |
| 8,428,305 B2 | 4/2013 | Zhang |
| 9,110,196 B2 | 8/2015 | Urmson |
| 9,335,178 B2 | 5/2016 | Ninkolaou |
| 2006/0064232 A1 | 3/2006 | Ampunan et al. |

(Continued)

FOREIGN PATENT DOCUMENTS

| DE | 102008045067 A1 | 3/2010 |
| WO | WO 2014/168851 A1 | 10/2014 |
| WO | WO 2016/032638 A1 | 3/2016 |

OTHER PUBLICATIONS

Ice detector warns drivers in advance: Technology makes driving on black ice safer, Jan. 23, 2013, http://phys.org/news/201301icedetectordriversadvancetechnology.html.

(Continued)

*Primary Examiner* — Michael D Lang
(74) *Attorney, Agent, or Firm* — David R. Stevens; Stevens Law Group

(57) ABSTRACT

Example ice and snow detection systems and methods are described. In one implementation, a method activates an ice and snow detection system in response to receiving weather data indicating a likelihood of ice or snow on a roadway near a vehicle. The method receives data from multiple vehicle sensors and analyzes the received data to identify ice or snow on the roadway. If ice or snow is identified on the roadway, the method adjusts vehicle operations and reports the ice or snow condition to a shared database.

18 Claims, 5 Drawing Sheets

(56) References Cited

U.S. PATENT DOCUMENTS

2008/0129541 A1 6/2008 Lu
2010/0004863 A1 1/2010 Ladow et al.
2015/0178572 A1* 6/2015 Omer ................. G08G 1/0112
       382/108

OTHER PUBLICATIONS

Volvo tests icedetection system, Mar. 24, 2014, http://www.goauto.com.au/mellor/mellor.nsf/story2/19DDB95BFA532531CA257CA5001B5BE1.

* cited by examiner

ICE AND SNOW DETECTION SYSTEMS AND METHODS

TECHNICAL FIELD

The present disclosure relates to vehicular systems and, more particularly, to systems and methods that detect the presence of ice or snow on a roadway.

BACKGROUND

Automobiles and other vehicles provide a significant portion of transportation for commercial, government, and private entities. Vehicles, such as autonomous vehicles, drive on roadways that may experience a build-up of ice or snow on the roadway surface. The presence of ice or snow on a roadway presents a potential risk to the vehicle due to a loss of traction with the roadway surface and a resulting loss of vehicle control. Thus, ice or snow on a roadway surface presents a risk of injury to occupants of vehicles driving on roadways with ice or snow. Detection of ice or snow on a roadway can reduce the likelihood of accidents and potential injury to vehicle occupants.

BRIEF DESCRIPTION OF THE DRAWINGS

Non-limiting and non-exhaustive embodiments of the present disclosure are described with reference to the following figures, wherein like reference numerals refer to like parts throughout the various figures unless otherwise specified.

DETAILED DESCRIPTION

Figure 1:
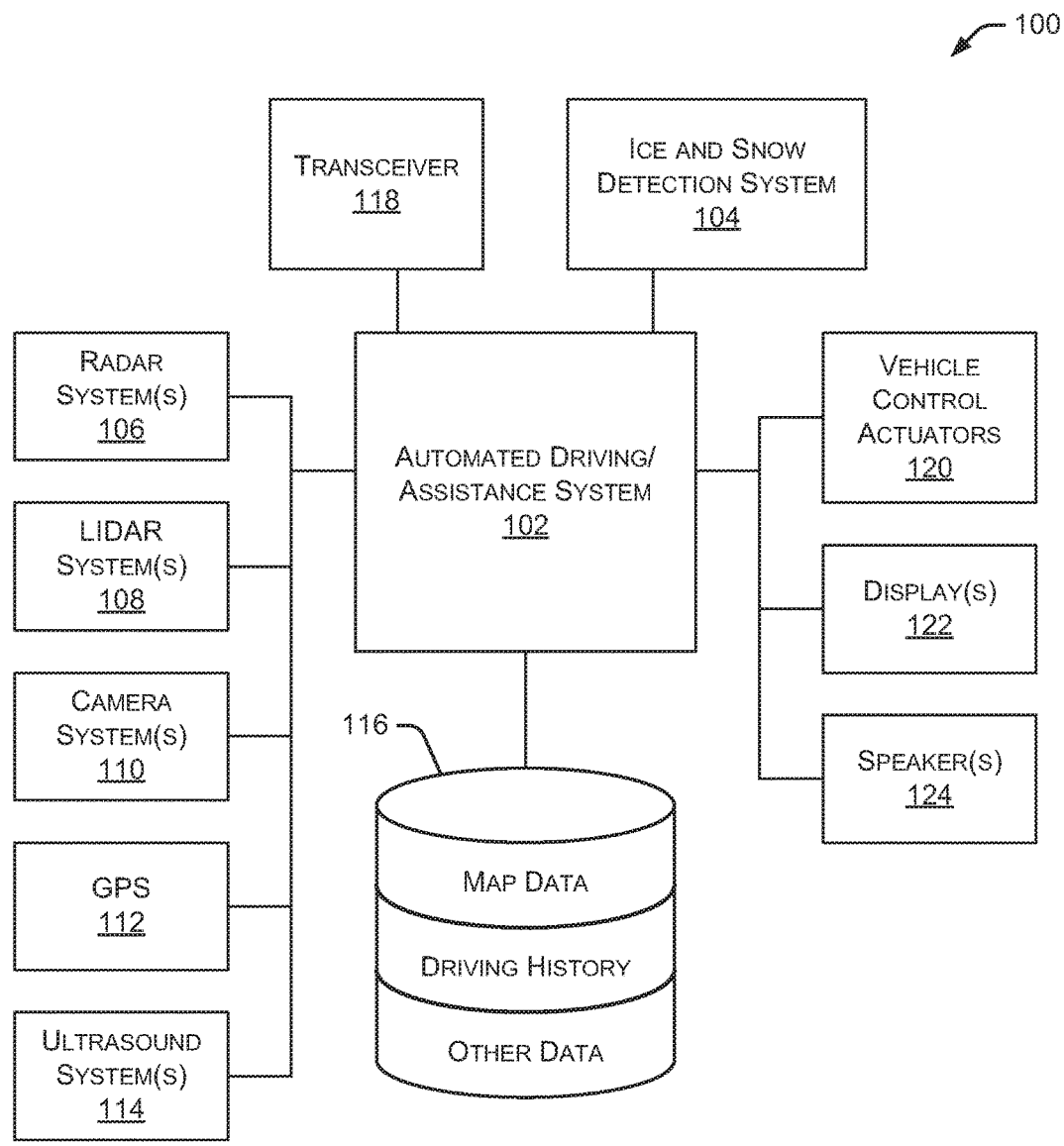
FIG. 1 is a block diagram illustrating an embodiment of a vehicle control system that includes an ice and snow detection system.

In the following disclosure, reference is made to the accompanying drawings, which form a part hereof, and in which is shown by way of illustration specific implementations in which the disclosure may be practiced. It is understood that other implementations may be utilized and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Implementations of the systems, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter is described in language specific to structural features and/or methodological acts, it is to be understood that the subject matter defined in the appended claims is not necessarily limited to the described features or acts described herein. Rather, the described features and acts are disclosed as example forms of implementing the claims.

Those skilled in the art will appreciate that the disclosure may be practiced in network computing environments with many types of computer system configurations, including, an in-dash vehicle computer, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. As one skilled in the art will appreciate, components may be referred to by different names. This document does not intend to distinguish between components that differ in name, but not function.

It should be noted that the sensor embodiments discussed herein may comprise computer hardware, software, firmware, or any combination thereof to perform at least a portion of their functions. For example, a sensor may include computer code configured to be executed in one or more processors, and may include hardware logic/electrical circuitry controlled by the computer code. These example devices are provided herein purposes of illustration, and are not intended to be limiting. Embodiments of the present disclosure may be implemented in further types of devices, as would be known to persons skilled in the relevant art(s).

At least some embodiments of the disclosure are directed to computer program products comprising such logic (e.g., in the form of software) stored on any computer useable medium. Such software, when executed in one or more data processing devices, causes a device to operate as described herein.

FIG. 1 is a block diagram illustrating an embodiment of a vehicle control system 100 that includes an ice and snow detection system 104. An automated driving/assistance system 102 may be used to automate or control operation of a vehicle or to provide assistance to a human driver. For example, the automated driving/assistance system 102 may control one or more of braking, steering, seat belt tension, acceleration, lights, alerts, driver notifications, radio, vehicle locks, or any other auxiliary systems of the vehicle. In another example, the automated driving/assistance system 102 may not be able to provide any control of the driving (e.g., steering, acceleration, or braking), but may provide notifications and alerts to assist a human driver in driving safely. Vehicle control system 100 includes an ice and snow detection system 104 that interacts with various components in the vehicle control system to detect and respond to ice or snow on a roadway near the vehicle. In one embodiment, ice and snow detection system 104 detects ice or snow in the path of the vehicle (e.g., ahead of the vehicle) and adjusts one or more vehicle operations to avoid the ice/snow or allow the vehicle to safely drive across the ice/snow. Although ice and snow detection system 104 is shown as a separate component in FIG. 1, in alternate embodiments, ice and snow detection system 104 may be incorporated into automated driving/assistance system 102 or any other vehicle component.

The vehicle control system 100 also includes one or more sensor systems/devices for detecting a presence of nearby objects or determining a location of a parent vehicle (e.g., a vehicle that includes the vehicle control system 100). For example, the vehicle control system 100 may include radar systems 106, one or more LIDAR systems 108, one or more camera systems 110, a global positioning system (GPS) 112, and/or ultrasound systems 114. The one or more camera systems 110 may include a rear-facing camera mounted to the vehicle (e.g., a rear portion of the vehicle), a front-facing camera, and a side-facing camera. Camera systems 110 may also include one or more interior cameras that capture images of passengers and other objects inside the vehicle. The vehicle control system 100 may include a data store 116 for storing relevant or useful data for navigation and safety, such as map data, driving history, or other data. Additionally, data store 116 may store information related to ice or snow previously detected by the current vehicle or reported by other vehicles. The vehicle control system 100 may also include a transceiver 118 for wireless communication with a mobile or wireless network, other vehicles, infrastructure, or any other communication system.

The vehicle control system 100 may include vehicle control actuators 120 to control various aspects of the driving of the vehicle such as electric motors, switches or other actuators, to control braking, acceleration, steering, seat belt tension, door locks, or the like. The vehicle control system 100 may also include one or more displays 122, speakers 124, or other devices so that notifications to a human driver or passenger may be provided. A display 122 may include a heads-up display, dashboard display or indicator, a display screen, or any other visual indicator, which may be seen by a driver or passenger of a vehicle. The speakers 124 may include one or more speakers of a sound system of a vehicle or may include a speaker dedicated to driver or passenger notification.

It will be appreciated that the embodiment of FIG. 1 is given by way of example only. Other embodiments may include fewer or additional components without departing from the scope of the disclosure. Additionally, illustrated components may be combined or included within other components without limitation.

In one embodiment, the automated driving/assistance system 102 is configured to control driving or navigation of a parent vehicle. For example, the automated driving/assistance system 102 may control the vehicle control actuators 120 to drive a path on a road, parking lot, driveway or other location. For example, the automated driving/assistance system 102 may determine a path based on information or perception data provided by any of the components 106-118. A path may also be determined based on a route that maneuvers the vehicle around an approaching patch of ice or snow on the roadway. The sensor systems/devices 106-110 and 114 may be used to obtain real-time sensor data so that the automated driving/assistance system 102 can assist a driver or drive a vehicle in real-time.

Figure 2:
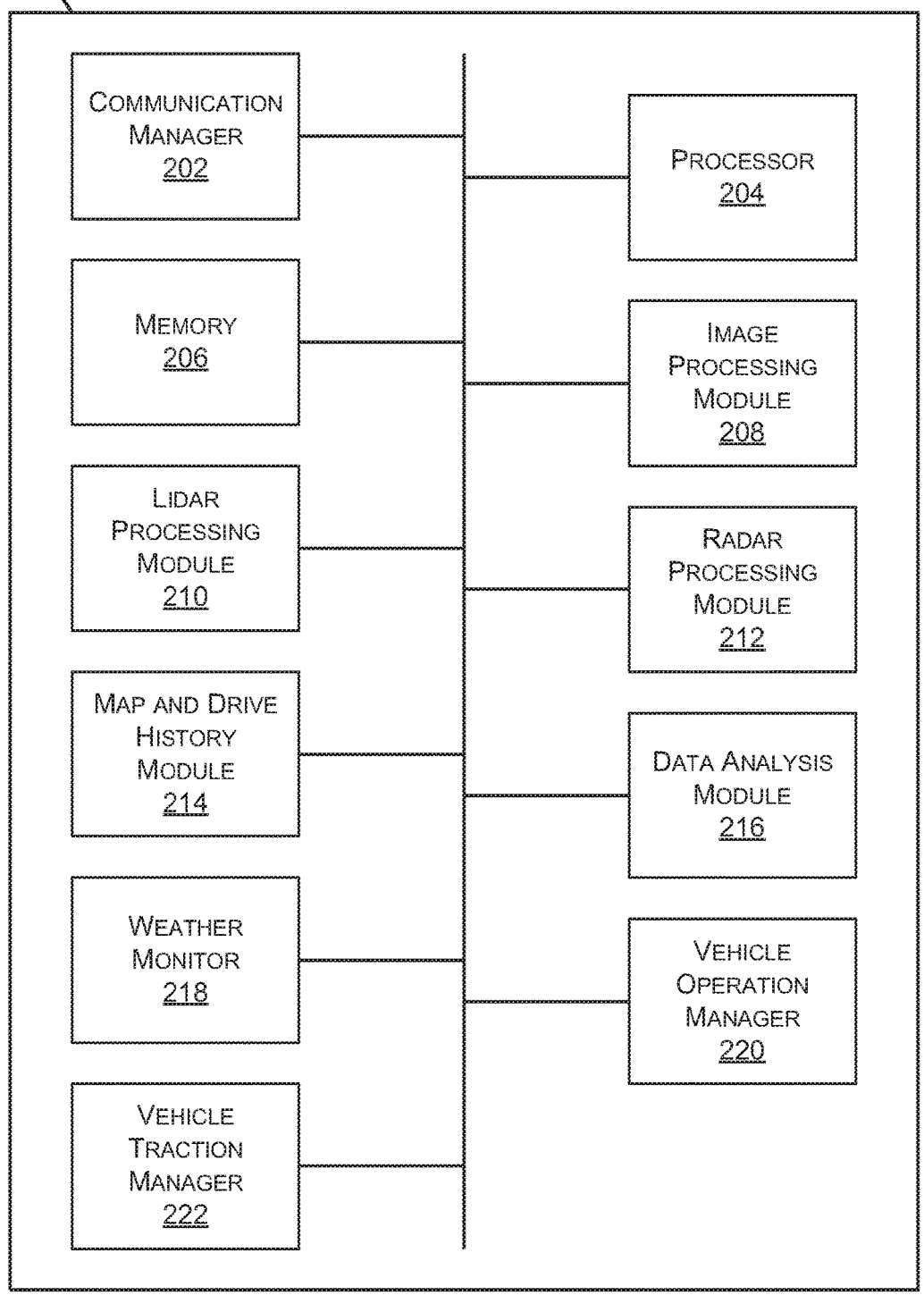
FIG. 2 is a block diagram illustrating an embodiment of an ice and snow detection system.

FIG. 2 is a block diagram illustrating an embodiment of ice and snow detection system 104. As shown in FIG. 2, ice and snow detection system 104 includes a communication manager 202, a processor 204, and a memory 206. Communication manager 202 allows ice and snow detection system 104 to communicate with other systems, such as automated driving/assistance system 102. Processor 204 executes various instructions to implement the functionality provided by ice and snow detection system 104 as discussed herein. Memory 206 stores these instructions as well as other data used by processor 204 and other modules and components contained in ice and snow detection system 104.

Additionally, ice and snow detection system 104 includes an image processing module 208 that receives image data from one or more camera systems 110 and identifies, for example, ice or snow on a roadway near the vehicle. In some embodiments, image processing module 208 includes an ice and snow detection algorithm that identifies patches of ice or snow in the images of the roadway ahead of the vehicle. A LIDAR processing module 210 receives LIDAR data from one or more LIDAR systems 108 and identifies, for example, ice or snow on the roadway ahead of the vehicle. Similarly, a radar processing module 212 receives radar data from one or more radar systems 106 to identify, for example, ice or snow in the planned path of the vehicle.

Ice and snow detection system 104 also includes a map and drive history module 214 that receives road map information from one or more data sources, and receives vehicle drive history data from data store 116. In some embodiments, map and drive history module 214 uses the road map and drive history data to detect a difference in road surface height (or elevation), indicating the possibility of a build-up of ice or snow on the road surface. A data analysis module 216 performs various operations on data received from any number of sensors and/or data sources to detect the presence of ice or snow on a roadway surface.

Additionally, ice and snow detection system 104 includes a weather monitor 218 that monitors weather conditions near the vehicle and receives weather-related data from any number of data sources. A vehicle operation manager 220 adjusts various vehicle operations based on detection of ice or snow on the roadway, as discussed here. A vehicle traction manager 222 monitors a vehicle's traction between the vehicle's tires and the road surface to detect any slippage or skidding of the tires on the road surface. This slippage or skidding may indicate the presence of ice or snow on the surface of the roadway.

Figure 3:
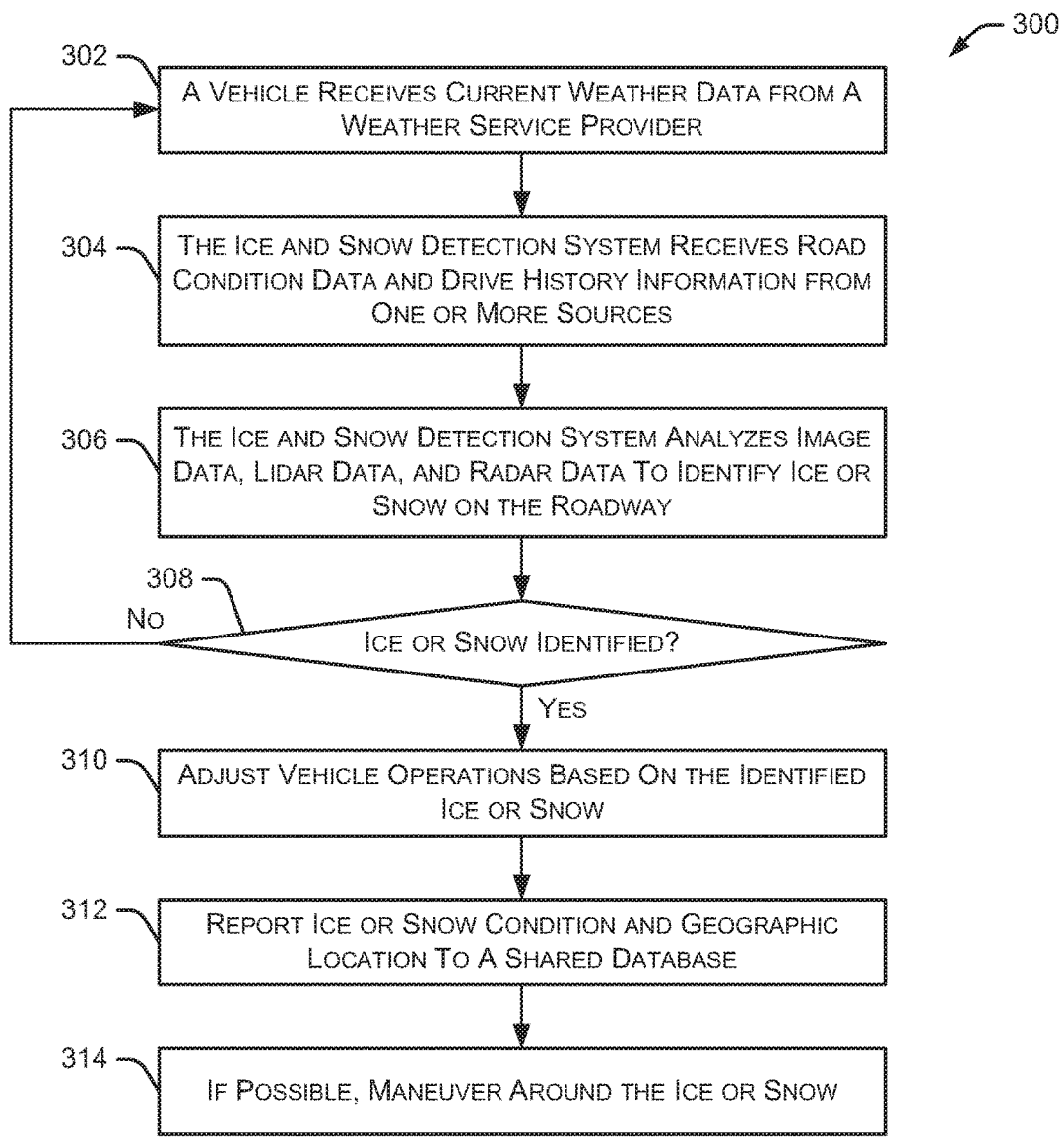
FIG. 3 illustrates an embodiment of a method for detecting ice or snow on a roadway.

FIG. 3 illustrates an embodiment of a method 300 for detecting ice or snow on a roadway. Initially, a vehicle receives 302 current weather data from a weather service provider or other weather data source. In some embodiments, ice and snow detection system 104 is activated when weather conditions near the vehicle are likely to produce ice or snow on the road surface. For example, if the weather near the vehicle is sunny with temperatures significantly above freezing, it may not be necessary to operate ice and snow detection system 104. However, if the temperature drops closer to freezing and precipitation is detected (or predicted by the weather data), ice and snow detection system 104 may be activated to monitor the roadway for ice or snow.

Method 300 continues as ice and snow detection system 104 receives 304 road condition data and drive history information from one or more sources. The road condition data may be received from any number of data sources, such as travel data sources, weather data sources, other organizations, other vehicles, other individuals, and the like. Example road condition data may indicate a significant likelihood of road icing or reports of actual ice or snow in the roadway. The drive history information includes, for example, road information and related data obtained by the vehicle during previous driving activities.

Ice and snow detection system 104 fuses the image data, LIDAR data, and radar data, then analyzes 306 the fused data to identify ice or snow on the roadway. For example, the fused data may provide a more complete coverage of the approaching environment. One type of sensor may "fill in" the gaps of another sensor type, thereby compensating for the weakness of a particular sensor. By combining data from multiple sensors, the combined confidence level may be greater because the confidence level is based on multiple sets of data from different types of sensors. In some embodiments, the image data, LIDAR data, and radar data are primarily associated with an area ahead of the vehicle (e.g., the area being approached by the vehicle). In other embodiments, the image data, LIDAR data, and radar data is associated with areas to the side of the vehicle and/or areas behind the vehicle. If snow or ice is not identified 308, the method 300 continues receiving and analyzing data to detect possible ice or snow at a future time.

In particular embodiments, ice or snow is detected on the roadway by determining a current height (e.g., elevation) of the roadway surface and comparing that height to a previously recorded height of the roadway surface or height data from roadway map data. The described systems and methods determine that ice or snow is present on the roadway if the current height of the roadway surface is greater than the previously recorded height of the roadway surface. The increased roadway surface height is attributed to a build-up of ice or snow on the roadway, causing an appearance that the roadway surface is higher than previously recorded. If multiple vehicle sensors detect an increased roadway surface height, a greater confidence level is achieved as compared to a single sensor detecting an increased roadway surface height. In particular embodiments, one or more LIDAR systems 108 determine the current height of the roadway surface.

In other embodiments, ice or snow is detected on the roadway by determining a current reflectivity of the roadway surface and comparing the current reflectivity of the roadway surface to a previously recorded reflectivity of the roadway surface. The described systems and methods determine that ice or snow is present on the roadway if the current reflectivity of the roadway surface is greater than the previously recorded reflectivity of the roadway surface. The increased roadway surface reflectivity is attributed to a build-up of ice or snow on the roadway, causing greater reflectivity than a non-icy roadway surface. In some embodiments, the reflectivity includes one or more of: visual reflectivity, LIDAR reflectivity, and radar reflectivity. In particular embodiments, one or more of radar systems 106, LIDAR systems 108, and camera systems 110 are used to determine whether the roadway surface has characteristics of the appearance of ice or snow.

In particular embodiments, ice or snow is detected on the roadway by determining a current road geometry of the roadway surface and comparing the comparing the current road geometry of the roadway surface to a previously recorded road geometry of the roadway surface. The road geometry includes a roughness (or other irregularity), smoothness or other road characteristic. The described systems and methods determine that ice or snow is present on the roadway if the current road geometry of the roadway surface is different than the previously recorded road geometry of the roadway surface. The changed road geometry may be caused by a build-up of ice or snow on the roadway, causing a rougher road than a non-icy roadway surface. In some embodiments, the roughness of the roadway surface is determined using the locations of points in a LIDAR point cloud on the surface of the roadway. In other embodiments, images captured by camera systems 110 detect visual roughness on the roadway surface.

If method 300 detects ice or snow on the roadway, vehicle operations are adjusted 310 based on the ice or snow. As discussed in greater detail with respect to FIG. 4, vehicle operations are adjusted to maneuver around the ice/snow on the roadway (if possible) or improve the control of the vehicle as it drives across the ice or snow. The ice or snow condition is reported 312 to a shared database (or other data storage mechanism) along with a geographic location associated with the ice and snow. This ice or snow condition report represents road condition data that may be used by other vehicles traveling on the same road or traveling on other roads in the same area which may experience similar ice or snow conditions. In some embodiments, the ice/snow condition and the geographic location is also recorded in the vehicle's drive history. In addition to adjusting vehicle operations 310, some embodiments of method 300 also attempt to maneuver 314 the vehicle around the ice or snow, thereby avoiding the potentially slippery area of the roadway.

Figure 4:
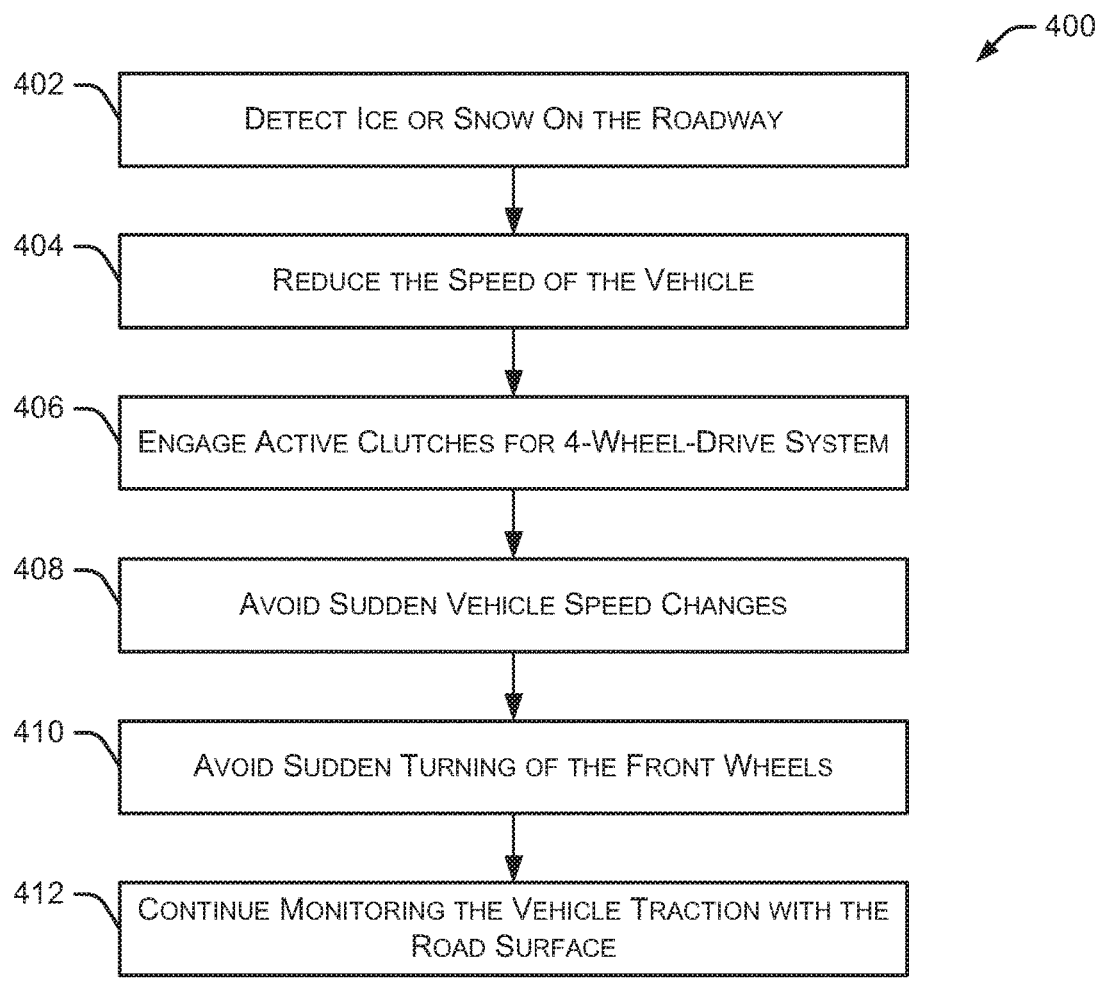
FIG. 4 illustrates an embodiment of a method for adjusting vehicle operations in response to detecting ice or snow on a roadway.

FIG. 4 illustrates an embodiment of a method 400 for adjusting vehicle operations in response to detecting ice or snow on a roadway. Initially, ice and snow detection system 104 detects 402 ice or snow on the roadway as discussed, for example, with respect to FIG. 3. In some embodiments, method 400 reduces 404 the speed of the vehicle such that the vehicle crosses the ice or snow at a slower speed at which the driver or automated driving/assistance system 102 can better maintain control of the vehicle. In particular situations, an active clutch is engaged 406 for a 4-wheel-drive system. Thus, rather than waiting until the car begins to slip or skid on the ice/snow, the active clutch is engaged such that the 4-wheel-drive system is actively operating to maintain traction for the vehicle and improve control of the vehicle as it drives across the ice or snow.

In some embodiments, ice and snow detection system 104 avoids 408 sudden vehicle speed changes (e.g., sudden acceleration or sudden deceleration) that may cause the vehicle to lose traction with the roadway and potentially lose control of the vehicle. Additionally, ice and snow detection system 104 avoids 410 sudden turning of the front wheels that may cause the vehicle to lose traction with the roadway. If steering is required, ice and snow detection system 104 attempts to make small steering changes while maintaining traction between the vehicle's tires and the roadway. Method 400 continues monitoring 412 the vehicle traction with the road surface and makes any necessary adjustments to maintain traction between the vehicle's tires and the roadway.

In some embodiments, the adjustments discussed with respect to FIG. 4 are implemented by sending appropriate instructions to one or more vehicle control actuators 120. For example, instructions may be sent to vehicle control actuators 120 to control braking, acceleration, and steering.

Figure 5:
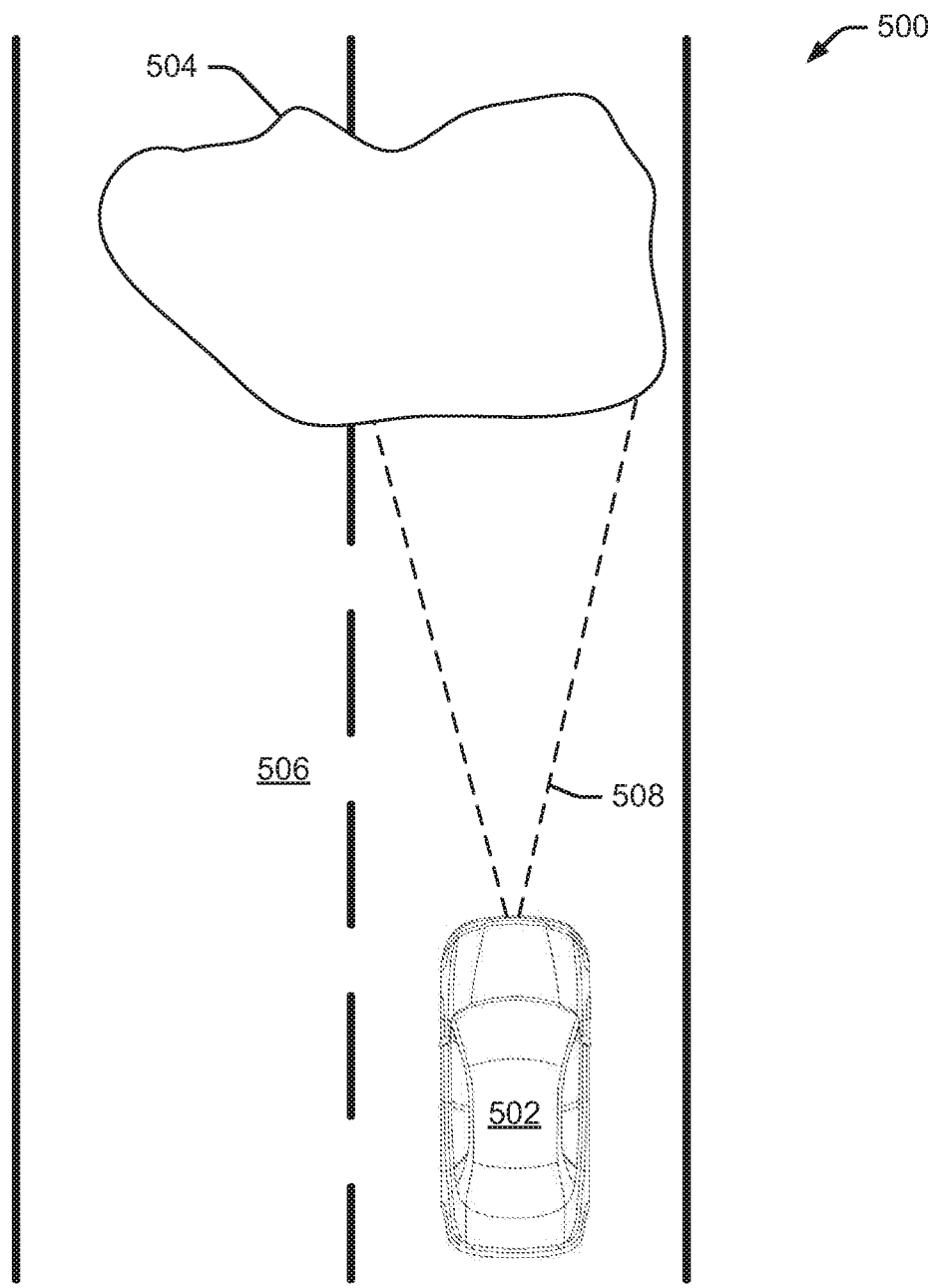
FIG. 5 illustrates an embodiment of vehicle approaching ice or snow on a roadway.

FIG. 5 illustrates an embodiment 500 of vehicle approaching ice or snow on a roadway. A vehicle 502 is traveling along a roadway 506 and is approaching a patch of ice/snow 504 on the roadway. One or more vehicle sensors (e.g., radar systems 106, LIDAR systems 108, and camera systems 110) may detect ice/snow 504 as indicated by broken lines 508 representing the detection area identified by the sensors. In some embodiments, a vehicle may attempt to maneuver around approaching ice or snow on the roadway. However, in the example of FIG. 5, vehicle 502 is not able to maneuver around ice/snow 504 without driving off the roadway or driving into oncoming traffic. In this situation, the systems and methods described herein adjust the operation of vehicle 502 to increase the likelihood that vehicle 502 maintains control as it drives across ice/snow 504.

While various embodiments of the present disclosure are described herein, it should be understood that they are presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the described exemplary embodiments, but should be defined only in accordance with the following claims and their equivalents. The description herein is presented for the purposes of illustration and description. It is not intended to be exhaustive or to limit the disclosure to the precise form disclosed. Many modifications and variations are possible in light of the disclosed teaching. Further, it should be noted that any or all of the alternate implementations discussed herein may be used in any combination desired to form additional hybrid implementations of the disclosure.

The invention claimed is:

1. A method comprising:
   activating an ice and snow detection system responsive to receiving weather data indicating a likelihood of ice or snow on a roadway proximate a vehicle;
   receiving data from a plurality of vehicle sensors;
   analyzing the received data to identify ice or snow on the roadway; and
   responsive to identification of ice or snow on the roadway:
     adjusting vehicle operations; and
     reporting the ice or snow condition to a shared database;
   wherein analyzing the received data to identify ice or snow on the roadway includes:
     determining a current height of the roadway surface;
     comparing the current height of the roadway surface to a previously recorded height of the roadway surface; and
     determining that ice or snow is present on the roadway when the current height of the roadway surface is greater than the previously recorded height of the roadway surface.

2. The method of claim 1, further comprising fusing the data received from the plurality of vehicle sensors.

3. The method of claim 1, wherein analyzing the received data to identify ice or snow on the roadway includes:
   determining a current reflectivity of the roadway surface;
   comparing the current reflectivity of the roadway surface to a previously recorded reflectivity of the roadway surface; and
   determining that ice or snow is present on the roadway if the current reflectivity of the roadway surface is greater than the previously recorded reflectivity of the roadway surface.

4. The method of claim 3, wherein the road surface reflectivity includes at least one of visual reflectivity, LIDAR reflectivity, and radar reflectivity.

5. The method of claim 1, wherein analyzing the received data to identify ice or snow on the roadway includes:
   determining a current road geometry of the roadway surface;
   comparing the current road geometry of the roadway surface to a previously recorded road geometry of the roadway surface; and
   determining that ice or snow is present on the roadway if the current road geometry of the roadway surface is more irregular than the previously recorded road geometry of the roadway surface.

6. The method of claim 1, wherein adjusting vehicle operations includes at least one of reducing the speed of the vehicle, engaging active clutches for a 4-wheel-drive system, avoiding sudden vehicle speed changes, and avoiding sudden turning of the front wheels.

7. The method of claim 1, wherein reporting the ice or snow condition to a shared database includes reporting a geographic location associated with the ice or snow condition.

8. The method of claim 1, further comprising attempting to maneuver around the ice or snow responsive to identification of ice or snow on the roadway.

9. The method of claim 1, wherein the vehicle is an autonomous vehicle.

10. A method comprising:
activating an ice and snow detection system responsive to receiving weather data indicating a likelihood of ice or snow on a roadway proximate a vehicle;
receiving image data from a vehicle-mounted camera;
receiving LIDAR data from a vehicle-mounted LIDAR system;
analyzing the received image data and LIDAR data to identify ice or snow on the roadway; and
responsive to identification of ice or snow on the roadway, performing at least one of the following: reducing the speed of the vehicle, engaging clutches for a 4-wheel-drive system, avoiding sudden vehicle speed changes, and avoiding sudden turning of the front wheels of the vehicle;
wherein analyzing the received image data and LIDAR data includes:
determining a current road geometry of the roadway surface;
comparing the current road geometry of the roadway surface to a previously recorded road geometry of the roadway surface; and
determining that ice or snow is present on the roadway if the current road geometry of the roadway surface is more irregular than the previously recorded road geometry of the roadway surface.

11. The method of claim 10, further comprising:
receiving radar data from a vehicle-mounted radar system; and
analyzing the received radar data to identify ice or snow on the roadway.

12. The method of claim 10, further comprising reporting the ice or snow condition, and the geographic location of the ice or snow, to a shared database.

13. The method of claim 10, further comprising fusing the image data and the LIDAR data.

14. The method of claim 10, wherein analyzing the received image data and LIDAR data includes:
determining a current height of the roadway surface;
comparing the current height of the roadway surface to a previously recorded height of the roadway surface; and
determining that ice or snow is present on the roadway if the current height of the roadway surface is greater than the previously recorded height of the roadway surface.

15. The method of claim 10, wherein analyzing the received image data and LIDAR data includes:
determining a current reflectivity of the roadway surface;
comparing the current reflectivity of the roadway surface to a previously recorded reflectivity of the roadway surface; and
determining that ice or snow is present on the roadway if the current reflectivity of the roadway surface is greater than the previously recorded reflectivity of the roadway surface.

16. The method of claim 15, wherein the road surface reflectivity includes at least one of visual reflectivity, LIDAR reflectivity, and radar reflectivity.

17. An apparatus comprising:
a camera configured to capture image data of an area ahead of a vehicle;
a LIDAR system configured to capture LIDAR data associated with the area ahead of the vehicle; and
an ice and snow detection system configured to analyze the image data and LIDAR data to identify ice or snow in the area ahead of the vehicle, wherein the ice and snow detection system is further configured to adjust at least one vehicle operation based on identification of ice or snow in a roadway surface ahead of the vehicle;
wherein the ice and snow detection system is further configured to:
determine a current height of the roadway surface;
compare the current height of the roadway surface to a previously recorded height of the roadway surface; and
when the current height of the roadway surface is greater than the previously recorded height of the roadway surface, determine that ice or snow is present on the roadway
determine a current road geometry of the roadway surface;
compare the current road geometry of the roadway surface to a previously recorded road geometry of the roadway surface; and
when the current road geometry of the roadway surface is more irregular than the previously recorded road geometry of the roadway surface, determine that ice or snow is present on the roadway.

18. The apparatus of claim 17, further comprising a vehicle control actuator configured to perform the at least one vehicle operation by adjust the vehicle's steering or braking systems.

* * * * *